US012255006B2

(12) United States Patent
Aoki et al.

(10) Patent No.: US 12,255,006 B2
(45) Date of Patent: Mar. 18, 2025

(54) INDUCTOR

(71) Applicant: Murata Manufacturing Co., Ltd., Kyoto-fu (JP)

(72) Inventors: Mikiya Aoki, Nagaokakyo (JP); Yasutaka Mizukoshi, Nagaokakyo (JP); Yuusuke Morita, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 679 days.

(21) Appl. No.: 17/199,930

(22) Filed: Mar. 12, 2021

(65) Prior Publication Data

US 2021/0287845 A1 Sep. 16, 2021

(30) Foreign Application Priority Data

Mar. 13, 2020 (JP) ................................ 2020-044398

(51) Int. Cl.

*H01F 27/29* (2006.01)
*H01F 17/02* (2006.01)
*H01F 27/32* (2006.01)

(52) U.S. Cl.

CPC ........... *H01F 27/292* (2013.01); *H01F 17/02* (2013.01); *H01F 27/327* (2013.01)

(58) Field of Classification Search

CPC ....... H01F 27/292; H01F 27/327; H01F 17/02
USPC .................................................. 336/199, 200
See application file for complete search history.

(56) References Cited

U.S. PATENT DOCUMENTS

| | | | | |
|---|---|---|---|---|
| 5,339,068 A * | 8/1994 | Tsunoda | H01C 1/142 338/308 |
| 6,535,105 B2 * | 3/2003 | Heistand, II | H01C 17/288 338/307 |
| 9,190,207 B2 * | 11/2015 | Hong | H01G 4/30 |
| 11,393,630 B2 * | 7/2022 | Yi | H01G 4/008 |
| 11,749,459 B2 * | 9/2023 | Lee | H01G 4/232 361/301.4 |
| 11,901,131 B2 * | 2/2024 | Lee | H01G 4/008 |

(Continued)

FOREIGN PATENT DOCUMENTS

| | | |
|---|---|---|
| CN | 107039144 A | 8/2017 |
| JP | H08-107038 A | 4/1996 |

(Continued)

*Primary Examiner* — Shawki S Ismail
(74) *Attorney, Agent, or Firm* — Studebaker Brackett PLLC

(57) ABSTRACT

An inductor that includes a body having a magnetic portion containing a magnetic powder and a first resin; a coil that is encapsulated in the body and includes a winding portion formed by winding a conductor and a pair of lead-out portions that extend from the winding portion; and a pair of outer electrodes to which at least end portions of the lead-out portions are connected at surfaces of the body. The outer electrodes each includes an electrically conductive resin layer and a first cover layer arranged on the electrically conductive resin layer. The electrically conductive resin layers each contain an electrically conductive powder and a second resin and a plurality of electrically conductive metal portions composed of the same material as the first cover layers are contained inside the electrically conductive resin layers.

17 Claims, 6 Drawing Sheets

(56) References Cited

U.S. PATENT DOCUMENTS

| | | | | |
|---|---|---|---|---|
| 2014/0063683 | A1 * | 3/2014 | Gu | H01G 4/2325<br>427/79 |
| 2014/0233147 | A1 * | 8/2014 | Hong | H01G 4/008<br>361/301.4 |
| 2016/0035476 | A1 * | 2/2016 | Mimura | H01F 41/046<br>336/199 |
| 2016/0260535 | A1 * | 9/2016 | Kubota | H01F 17/0013 |
| 2017/0169930 | A1 * | 6/2017 | Kudo | H01F 17/0013 |
| 2017/0223832 | A1 * | 8/2017 | Chung | H01G 2/065 |
| 2018/0174753 | A1 * | 6/2018 | Terashita | H01G 4/008 |
| 2019/0164696 | A1 * | 5/2019 | Onodera | H01G 4/008 |
| 2020/0168388 | A1 * | 5/2020 | Lee | H01F 41/041 |
| 2020/0185153 | A1 * | 6/2020 | Yun | H01G 4/2325 |

FOREIGN PATENT DOCUMENTS

| | | | | | |
|---|---|---|---|---|---|
| JP | H10-284342 | A | | 10/1998 | |
| JP | 2014241453 | A | * | 12/2014 | H01G 4/0085 |
| JP | 2016032050 | A | | 3/2016 | |
| JP | 2017-073539 | A | | 4/2017 | |

* cited by examiner

INDUCTOR

CROSS-REFERENCE TO RELATED APPLICATION

This application claims benefit of priority to Japanese Patent Application No. 2020-044398, filed Mar. 13, 2020, the entire content of which is incorporated herein by reference.

BACKGROUND

Technical Field

The present disclosure relates to an inductor.

Background Art

Japanese Unexamined Patent Application Publication No. 2016-32050 proposes an inductor in which an air-core coil is buried inside a magnetic body composed of a resin and metal magnetic particles and that has terminal electrodes that are electrically connected to both ends of the coil and are formed of an electrically conductive resin containing silver (Ag) particles.

In outer electrodes composed of an electrically conductive resin containing electrically conductive particles, unlike in outer electrodes composed of plating or sintered metal, the electrical conductivity is ensured by the proximity and contact between the electrically conductive particles, and therefore the DC resistance of the outer electrodes themselves is high. Therefore, the DC resistance of an inductor using outer electrodes composed of an electrically conductive resin may be high.

SUMMARY

Accordingly, the present disclosure provides an inductor capable of reducing the DC resistance thereof.

A first preferred embodiment of the present disclosure provides an inductor that includes a body including a magnetic portion containing a magnetic powder and a first resin; a coil that is encapsulated in the body and includes a winding portion formed by winding a conductor and a pair of lead-out portions that extend from the winding portion; and a pair of outer electrodes to which at least end portions of the lead-out portions are connected at surfaces of the body. The outer electrodes each include an electrically conductive resin layer and a first cover layer arranged on the electrically conductive resin layer. The electrically conductive resin layers each contain an electrically conductive powder and a second resin and a plurality of electrically conductive metal portions composed of the same material as the first cover layers are contained inside the electrically conductive resin layers.

According to the preferred embodiment of the present disclosure, an inductor capable of reducing the DC resistance thereof can be provided.

Other features, elements, characteristics and advantages of the present disclosure will become more apparent from the following detailed description of preferred embodiments of the present disclosure with reference to the attached drawings.

DETAILED DESCRIPTION

Figure 1:
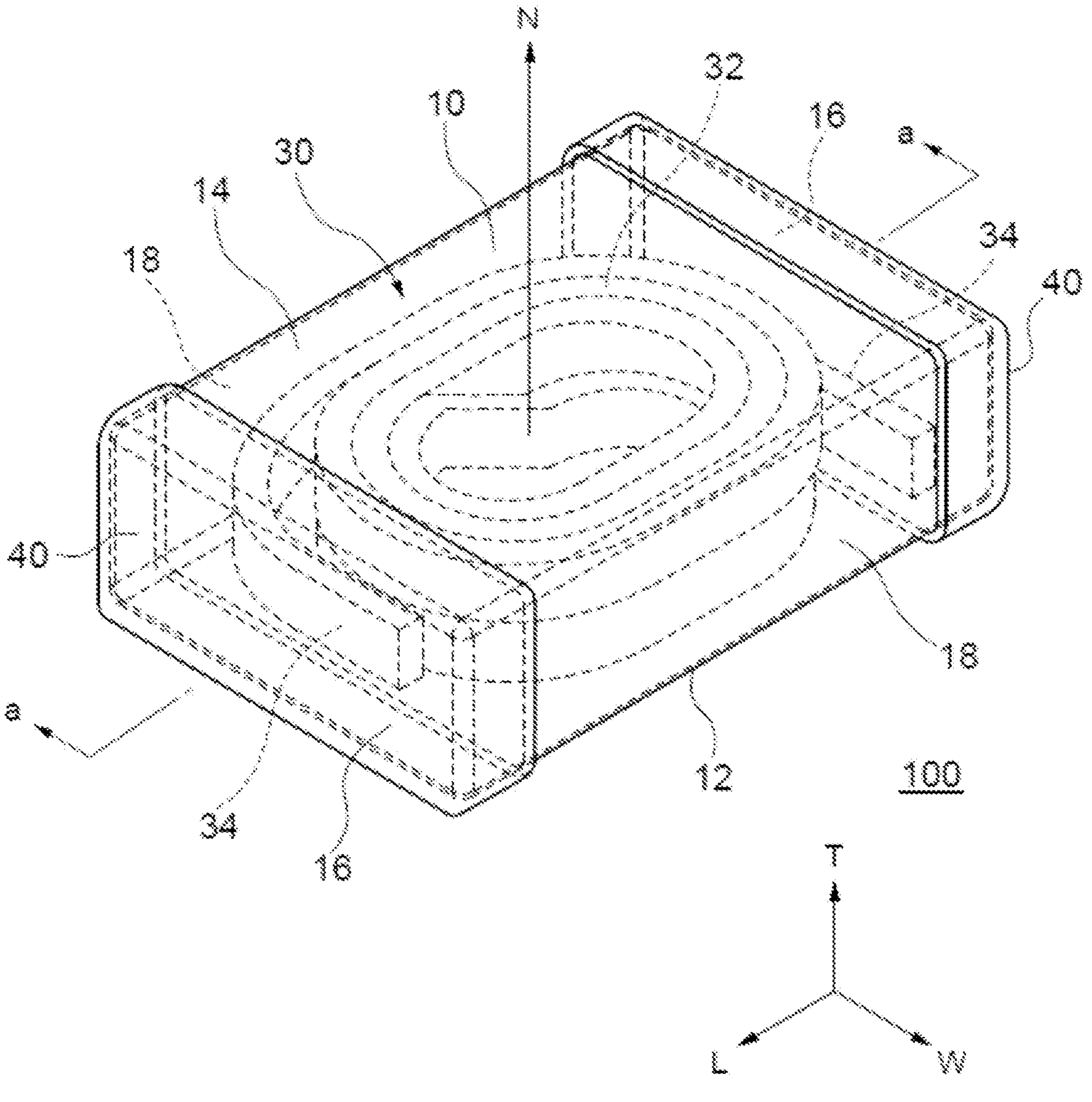
FIG. 1 is a partial see-through perspective view in which an inductor of embodiment 1 is viewed from above.

An inductor includes a body including a magnetic portion containing a magnetic powder and a first resin; a coil that is encapsulated in the body and includes a winding portion formed by winding a conductor and a pair of lead-out portions that extend from the winding portion; and a pair of outer electrodes to which at least end portions of the lead-out portions are connected at surfaces of the body. The outer electrodes each include an electrically conductive resin layer and a first cover layer arranged on the electrically conductive resin layer. The electrically conductive resin layers each contain an electrically conductive powder and a second resin and a plurality of electrically conductive metal portions composed of the same material as the first cover layers are contained inside the electrically conductive resin layers.

The connection resistance between the lead-out portions of the coil and the outer electrodes is further reduced due to the contact between the electrically conductive powder particles in the electrically conductive resin layers being increased by arranging the electrically conductive metal portions in the electrically conductive resin layers.

The end portions of the lead-out portions and the first cover layers may be directly connected to each other by the electrically conductive metal portions. The connection resistance between the lead-out portions of the coil and the outer electrodes is further reduced and the adhesion strength of the outer electrodes to the body is also improved by the end portions of the lead-out portions and the first cover layer being directly connected to each other by the electrically conductive metal portions provided in the electrically conductive resin layers.

The surfaces of the body on which the outer electrodes are arranged include magnetic powder exposed portions where the magnetic powder is exposed and at least some of the exposed magnetic powder and the first cover layers may be connected to each other by the electrically conductive metal portions. The adhesion strength between the body and the outer electrodes is improved by the body and the first cover layer being directly connected to each other by the electrically conductive metal portions provided in the electrically conductive resin layers.

The electrically conductive metal portions may be arranged in a branch-like manner. The electrically conductive metal portions that directly connect the lead-out portions of the coil and the outer electrodes to each other can be easily arranged inside the electrically conductive resin layers by forming the electrically conductive metal portions in a branch-like manner.

The outer electrodes may each further include a second cover layer arranged on the first cover layer. The reliability when mounting the inductor on a substrate is further improved by the outer electrodes each including a second cover layer.

The body may have a bottom surface and end surfaces that face each other and are adjacent to the bottom surface, and the outer electrodes may be arranged on at least the bottom surface and the end surfaces. The adhesion strength of the inductor to a substrate when the inductor is mounted on a substrate is further improved by arranging each outer electrode so as to extend along at least two surfaces of the body.

The end portions of the lead-out portions may be exposed at the end surfaces of the body. This allows the lead-out portions to be easily formed.

The first resin may be a different type of resin than the second resin. In addition, the first resin may contain a thermosetting resin and the second resin may contain a thermoplastic resin. This allows the electrically conductive metal portions to be easily formed by the electrically conductive resin layer.

The first cover layers may contain nickel and the second cover layers may contain tin. In addition, the thickness of the first cover layers may be around 100 μm or less. This enables the lead-out portions of the coil and the outer electrodes to be easily connected to each other by the first cover layers.

The term "step" used in this specification refers not only to an independent step but also a step that cannot be clearly distinguished from another step so long as the expected aim of that step is achieved. Hereafter, embodiments of the present disclosure will be described on the basis of the drawings. The following embodiments are exemplary examples of an inductor for making the technical concepts of the present disclosure clear, and the present disclosure is not limited to the inductors described below. Members described in the scope of the claims are in no way limited to the members described in the embodiments. In particular, unless specifically stated otherwise, it is not intended that scope of the present disclosure be limited to the dimensions, materials, shapes, relative arrangements, and so forth of constituent components described in the embodiments and these are merely explanatory examples. Identical parts are denoted by identical symbols in the drawings. Taking explanation of important points or ease of understanding into account, the embodiments are described in a separate manner for the sake of convenience, but parts of the configurations illustrated in the different embodiments may be substituted for one another or combined with each other. In embodiment 2 and embodiments thereafter, description of matters common to embodiment 1 is omitted and the description focuses on the points that are different. In particular, the same operational effects resulting from the same configurations will not be repeatedly described in the individual embodiments.

EMBODIMENTS

Hereafter, the present disclosure will be described in a specific manner using embodiments, but the present disclosure is not limited to these embodiments.

Embodiment 1

Figure 2:
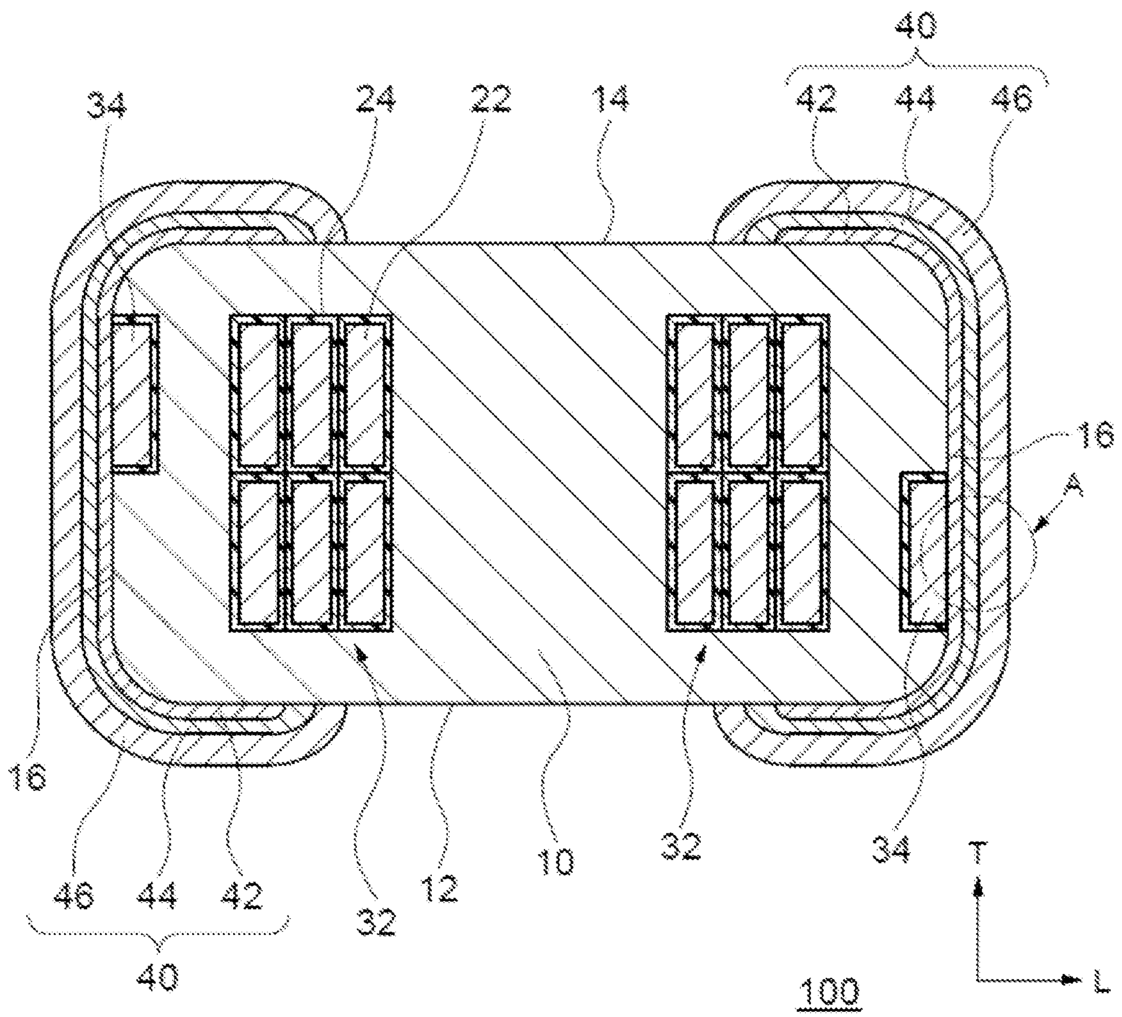
FIG. 2 is a sectional view of the inductor of embodiment 1 taken along line a-a in FIG. 1.
Figure 3:
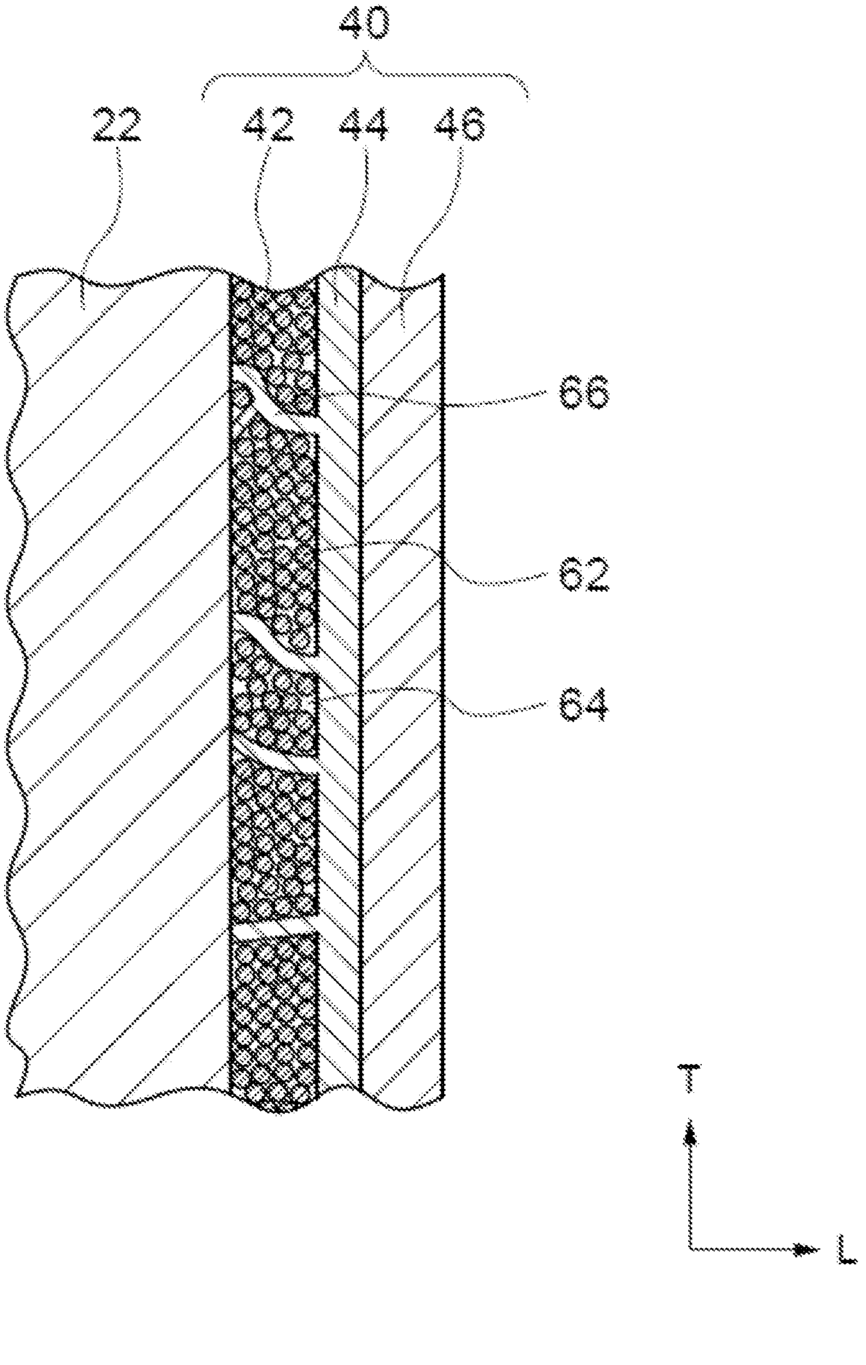
FIG. 3 is a partial expanded sectional view of part A in FIG. 2 of the inductor of embodiment 1.

An inductor of embodiment 1 will be described while referring to FIGS. 1 to 3. FIG. 1 is a partial see-through schematic perspective view in which an inductor 100 is viewed from above. FIG. 2 is a schematic sectional view of the inductor 100 along a plane perpendicular to the bottom surface and the top surface of the inductor 100 taken along line a-a in FIG. 1. FIG. 3 is a partial enlarged schematic sectional view of part A in FIG. 2.

As illustrated in FIG. 1, the inductor 100 includes: a body 10 that includes a magnetic portion containing a magnetic powder and a first resin; a coil 30 that is encapsulated in the body 10; and outer electrodes 40 are arranged on the surfaces of the body 10 and electrically connected to the coil 30. The body 10 has a bottom surface 12, which is on the mounting surface side, a top surface 14 that faces the bottom surface 12 in a height direction (T direction), two end surfaces 16 that are adjacent to and substantially perpendicular to the bottom surface 12 and face each other in a length direction (L direction), and two side surfaces 18 that are adjacent to and substantially perpendicular to the bottom surface 12 and the end surfaces 16 and face each other in a width direction (W direction). The coil 30 includes a winding portion 32 formed by winding a conductor around a winding axis N and a pair of lead-out portions 34 that extend from the winding portion 32. The coil 30 is encapsulated in the body 10 such that the end portions of the lead-out portions 34 are exposed from the end surfaces 16 of the body 10. The pair of outer electrodes 40 are arranged on five surfaces of the body 10, namely, the bottom surface 12, the end surfaces 16, the top surface 14, and the side surfaces 18 of the body 10 and are connected, at the end surfaces 16, to the end portions of the lead-out portions 34 of the coil 30, which are exposed from the end surfaces 16. In FIG. 1, dashed lines may be used as auxiliary lines to represent curved surfaces.

As illustrated in FIG. 2, the outer electrodes 40 are each formed by sequentially stacking an electrically conductive resin layer 42, a first cover layer 44, and a second cover layer 46. The electrically conductive resin layers 42 are formed by applying an electrically conductive resin composition containing an electrically conductive powder and a second resin to the surfaces of the body 10 and the electrically conductive resin layers 42 are electrically connected to the end portions of the lead-out portions 34 of the coil exposed from the end surfaces 16. The electrically conductive powder may contain silver (Ag) particles, for example. The volume average particle diameter of the Ag particles may be around 10 nm to 100 μm, for example. The electrically conductive powder may contain nano-size Ag particles, may contain micro-size Ag particles, or may contain both nano-size and micro-size Ag particles. In addition, the second resin may contain a thermoplastic resin such as an acrylic resin, for example. The first cover layers 44, for example, contain nickel and may be formed on the electrically conductive resin layers 42 by performing a plating process. The second cover layers 46, for example, contain tin and may be formed on the first cover layers by a performing a plating process.

FIG. 3 schematically illustrates the connection state between the end portions of the lead-out portions 34 and the outer electrodes 40. As illustrated in FIGS. 2 and 3, a coating layer 24 is removed from the end portions of the lead-out portions 34 exposed at the end surfaces 16 and a conductor 22 is exposed at the end surfaces 16. The electrically conductive resin layers 42 are arranged on the surfaces of the exposed conductor 22. The electrically conductive resin layers 42 contain an electrically conductive powder 62 and a second resin 64 and further include electrically conductive metal portions 66. A plurality of the electrically conductive metal portions 66 are formed inside the electrically conductive resin layers 42 in a branch-like manner. In the electrically conductive resin layers 42, in addition to the conductor 22 and the first cover layers 44 being electrically connected to each other due to the proximity and contact between the particles of the electrically conductive powder 62, the electrically conductive metal portions 66 directly connect the conductor 22 and the first cover layers 44 to each other. The branch-like electrically conductive metal portions 66 are formed in the following ways, for example. When the electrically conductive resin layers 42 are formed, voids are formed in the electrically conductive resin layers 42 due to curing shrinkage and thermal contraction of the second resin. In this case, the voids in the electrically conductive resin layers 42 may be formed by parts of the second resin being removed as a result of the electrically conductive resin layers 42 being subjected to laser irradiation. Subsequently, when the first cover layers 44 are formed by performing a plating process, the metal constituting the first cover layers 44 may be plated and grown in the voids in the conductive resin layers 42 to form the branch-like electrically conductive metal portions 66. In other words, the electrically conductive metal portions 66 may be integrally formed with the first cover layers 44. The electrically conductive metal portions 66 may alternatively be formed in network-like shape inside the electrically conductive resin layers 42. The electrically conductive metal portions 66 arranged in a network-like shape may be arranged along boundaries between particles of the electrically conductive powder 62. In one mode, the electrically conductive resin layers 42 may be formed to have a porous structure containing the electrically conductive powder and the second resin, and the electrically conductive metal portions 66, which directly connect the conductor forming the coil and the first cover layers to each other, may be arranged in the voids of the porous structure. Contact between the particles of the electrically conductive powder 62 may be increased and the connection resistance may be reduced by forming the electrically conductive resin layers 42 to have a porous structure. At least some of the electrically conductive metal portions 66 may or may not directly connect the end portions of the lead-out portions 34 and the first cover layers 44 to each other. The electrically conductive metal portions 66 are preferably formed so as to be dispersed inside the electrically conductive resin layers 42 and the electrically conductive metal portions 66 are preferably formed as many branches.

The thickness of the electrically conductive resin layers 42 may be, for example, around 50 nm to 100 μm or around 1 μm to 20 μm. The thickness of the first cover layers may be, for example, around 30 μm or less or around 0.5 μm to 15 μm. The thickness of the second cover layers may be, for example, around 50 μm or less or around 1 μm to 30 μm.

As illustrated in FIG. 2, the conductor 22 forming the coil 30 has the coating layer 24 on the surface thereof and the cross-sectional shape of the conductor in a direction perpendicular to the extension direction of the conductor (length direction) is a substantially rectangular shape defined by the thickness and width thereof. The thickness of the conductor may be around 0.01 to 1 mm, for example. The width of the conductor may be around 0.1 to 2 mm, for example. The aspect ratio (width/thickness) of the cross-section of the conductor may be, for example, around 1/1 or higher or around 1/1 to 30/1. In addition, the coating layer 24 covering the conductor 22 is formed of an insulating resin such as polyimide or polyamide-imide with a thickness of, for example, around 2 μm to 20 μm. In order to prevent the winding portion from unwinding, a fusion layer including a self-fusing component such as a thermoplastic resin or a thermosetting resin may be further provided on the surface of the coating layer 24, and the thickness of the layer may be around 1 μm to 8 μm.

The winding portion 32 of the coil 30 is wound in a spiral shape so that both ends of the conductor are located at the outermost periphery and one of the surfaces defined by the width of the conductor is located at the outer periphery and the other surface defined by the width of the conductor is located at the inner periphery, and the winding portion 32 is wound vertically in two stages that are connected at the innermost periphery with the surfaces defined by the thickness of the conductor facing each other (a so-called alpha winding). The coil 30 is encapsulated by the body 10 with the winding axis N of the winding portion 32 being substantially perpendicular to the bottom surface 12 and the top surface 14 of the body 10.

As illustrated in FIGS. 1 and 2, one lead-out portion 34 extends from the outer periphery of the upper stage of the winding portion 32, which is on the side near the top surface 14, with the end portion thereof pointing toward one side surface 18 of the body 10 and a surface thereof defined by the width of the conductor 22 is exposed at one end surface 16 of the body 10. The other lead-out portion 34 extends from the outer periphery of the lower stage of the winding portion 32, which is on the side near the bottom surface 12, with the end portion thereof pointing toward one side surface 18 of the body 10 and a surface thereof defined by the width of the conductor 22 is exposed at one end surface 16 of the body 10. The coating layer 24 is removed from the surfaces of the conductor 22 exposed from the end surfaces 16.

The body 10 may have a substantially rectangular parallelepiped shape. The body 10 has a length L of, for example, around 1 to 3.4 mm and preferably around 1 to 3 mm, a width W of, for example, around 0.5 to 2.7 mm and preferably around 0.5 to 2.5 mm, and a height T of, for example, around 0.5 to 2 mm and preferably around 0.5 to 1.5 mm. As specific examples of the size of the body, L×W×T may be 1 mm×0.5 mm×0.5 mm, 1.6 mm×0.8 mm×0.8 mm, 2 mm×1.2 mm×1 mm, or 2.5 mm×2 mm×1.2 mm, for example.

The magnetic portion of the body 10 is formed of a composite material containing a magnetic powder and the first resin. An iron-based metal magnetic powder such as Fe, Fe—Si, Fe—Ni, Fe—Si—Cr, Fe—Si—Al, Fe—Ni—Al, Fe—Ni—Mo, and Fe—Cr—Al, a metal magnetic powder having another composition basis, an amorphous metal magnetic powder or the like, a metal magnetic powder in which the surfaces of the powder particles are coated with an insulating layer such as glass, a surface-modified metal magnetic powder, or a nano-level fine metal magnetic powder is used as the magnetic powder. Furthermore, a thermosetting resin such as an epoxy resin, a polyimide resin, or a phenol resin, or a thermoplastic resin such as a polyethylene resin, a polyamide resin, or a liquid crystal polymer is used as the first resin. The filling ratio of the magnetic powder in the composite material is, for example, around 50 to 85% by mass and preferably around 60 to 85% by mass or around 70 to 85% by mass.

A protective layer may be arranged on the surfaces of the body 10. The protective layer may be arranged on the surfaces of the body other than the regions where the outer electrodes are arranged or may be arranged on the surfaces of the body other than the regions where the end portions of the lead-out portions are exposed. The protective layer may contain a resin, for example. Furthermore, a thermosetting resin such as an epoxy resin, a polyimide resin, or a phenol resin, or a thermoplastic resin such as an acrylic resin, a polyethylene resin, or a polyamide resin is used as the resin forming the protective layer. The protective layer may contain a filler. An electrically non-conductive filler such as silicon oxide or titanium oxide is used as the filler. The protective layer is formed, for example, by applying a resin composition containing a resin and a filler to the surfaces of the body by performing coating, dipping, or the like, and curing the applied resin if necessary. The protective layer may be formed of a non-organic material. In addition, the protective layer may be formed on regions other than magnetic powder exposed regions, which are described later.

The body 10 may be provided with a marker (not illustrated). For example, the marker may be provided on the top surface 14 of the body, on the side where the lead-out portion 34 is led out from the lower stage of the winding portion 32, to indicate the polarity of the inductor. The marker may be provided by performing printing, laser engraving, and so on.

For example, the inductor 100 can be manufactured using a manufacturing method including: a coil forming step of forming a coil by molding a conductor into a desired shape; a body forming step of molding the body by burying the formed coil in a composite material containing a magnetic powder and a resin with the end portions of the lead-out portions exposed and performing pressing using a die or the like; and an outer electrode forming step including forming electrically conductive resin layers on the end portions of the lead-out portions exposed from the surfaces of the body and forming the first cover layers on the electrically conductive resin layers. In order to form branch-like electrically conductive metal portions, voids may be formed by allowing the second resin to shrink when an electrically conductive resin paste is applied and cured and then plating may also be grown in the voids in the electrically conductive resin layers 42 when the first cover layers are formed using a plating process.

Embodiment 2

Figure 4:
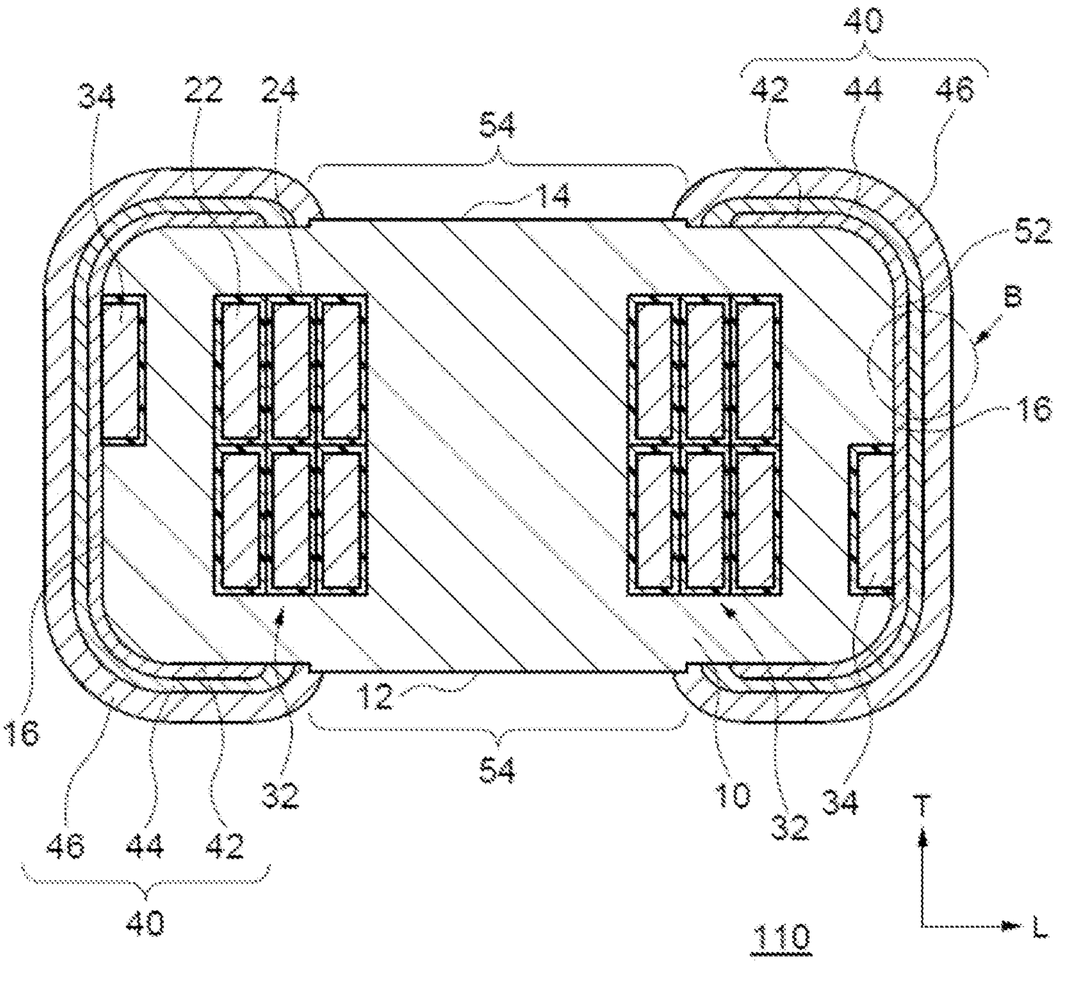
FIG. 4 is a sectional view of an inductor of embodiment 2.
Figure 5:
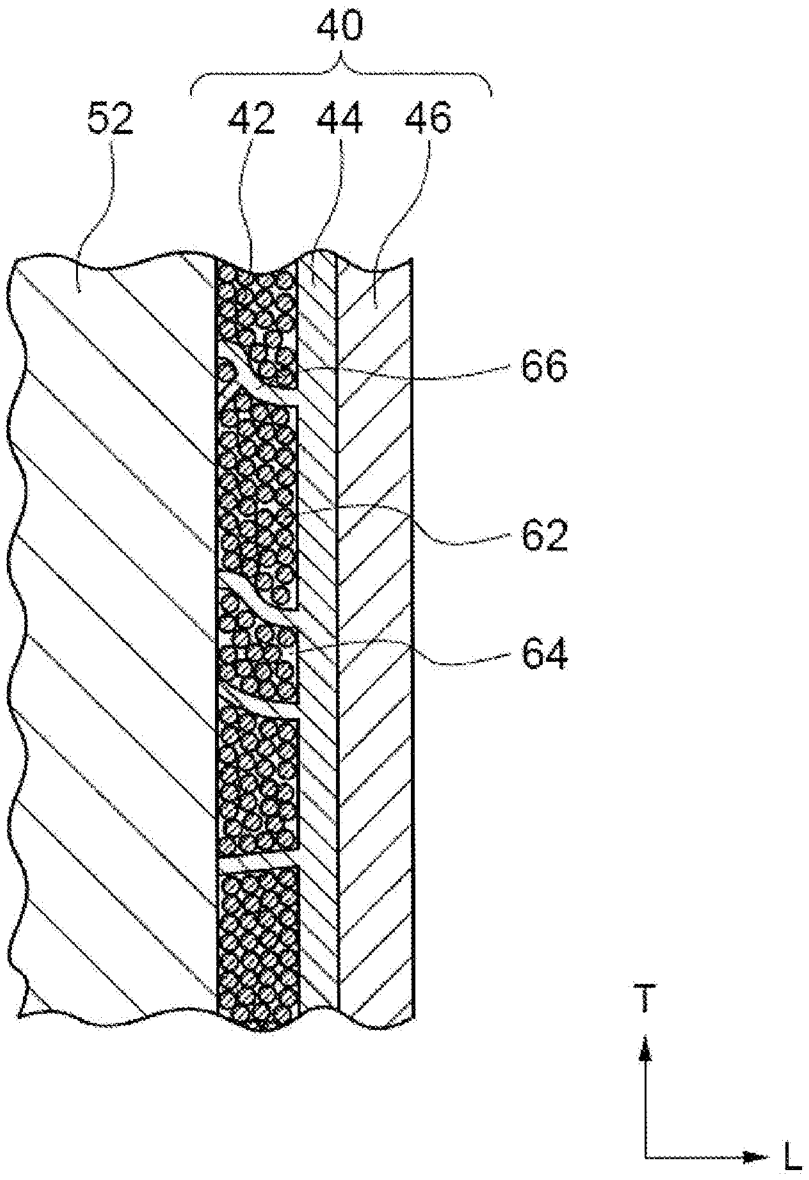
FIG. 5 is a partial expanded sectional view of part B in FIG. 4 of the inductor of embodiment 2.

An inductor of embodiment 2 will be described while referring to FIGS. 4 and 5. FIG. 4 is a schematic sectional view of an inductor 110. FIG. 5 is a partial enlarged schematic sectional view of part B in FIG. 4. The inductor 110 of embodiment 2 is configured similarly to the inductor 100 of embodiment 1 except that magnetic powder exposed regions are provided in parts of the surfaces of the body and the outer electrodes are formed on these magnetic powder exposed regions.

As illustrated in FIG. 4, in the inductor 110, magnetic powder exposed regions 52 are formed along portions of the bottom surface 12, portions of the top surface 14, portions of the side surfaces 18, and the end surfaces 16 of the body, and the outer electrodes 40 are arranged on the magnetic powder exposed regions 52. Magnetic powder non-exposed regions 54 are formed on the surfaces of the body in addition to the magnetic powder exposed regions 52. A protective layer may be arranged on the magnetic powder non-exposed regions 54.

The magnetic powder exposed regions 52 are formed by irradiating desired regions of the body with a laser, for example. In addition, the magnetic powder exposed regions 52 may be formed by sand blasting desired regions of the body, for example. The surfaces of metal particles constituting the magnetic powder may be exposed by removing at least part of an insulating layer covering the magnetic powder in the magnetic powder exposed regions 52. Furthermore, the magnetic powder may be exposed at surfaces of the body by removing parts of the first resin included in the body in the magnetic powder exposed regions 52.

FIG. 5 schematically illustrates the connection state between the magnetic powder exposed regions 52 and the outer electrodes 40. As illustrated in FIG. 5, the electrically conductive resin layers 42 are arranged on the magnetic powder exposed regions 52. The electrically conductive resin layers 42 contain the electrically conductive powder 62, the second resin 64, and the electrically conductive metal portions 66. The electrically conductive metal portions 66 connect the magnetic powder of the magnetic powder exposed regions 52 and the first cover layers 44 to each other. In one mode, the electrically conductive resin layers 42 may be formed to have a porous structure containing the electrically conductive powder and the second resin, and the electrically conductive metal portions 66, which connect the magnetic powder forming the body and the first cover layers to each other, may be arranged in the voids of the porous structure. An anchor effect is improved in the magnetic powder exposed regions 52 due to the surface roughness being higher. In addition, the magnetic powder and the first cover layers are directly connected to each other. This allows the adhesion strength of the outer electrodes 40 to the body to be improved. In the magnetic powder exposed regions, the electrically conductive metal portions do not necessarily have to connect the magnetic powder and the first cover layers to each other, and even in this case, the DC resistance can be reduced.

Embodiment 3

Figure 6:
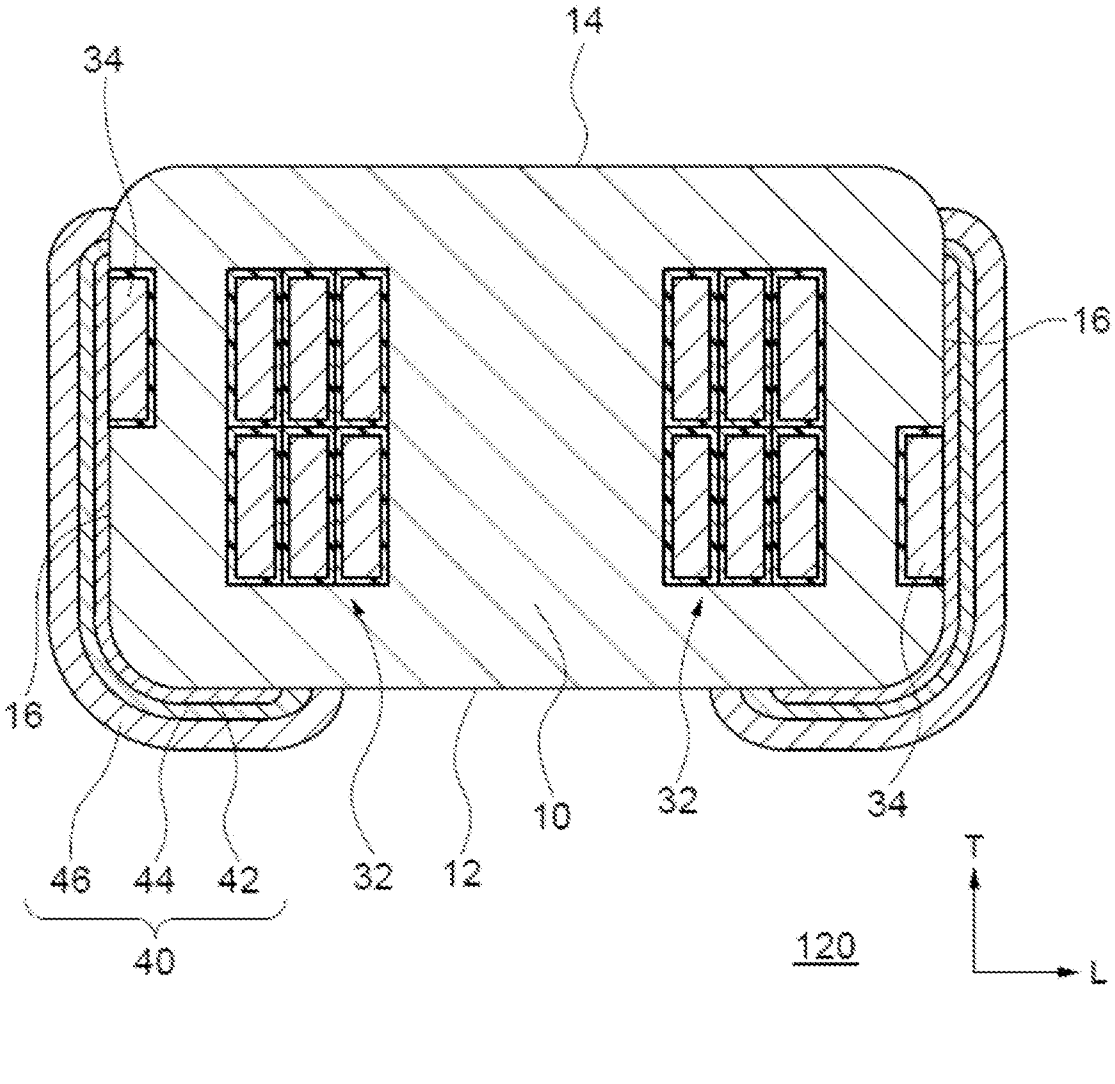
FIG. 6 is a sectional view of an inductor of embodiment 3.

An inductor of embodiment 3 will be described while referring to FIG. 6. FIG. 6 is a schematic sectional view of an inductor 120. The inductor 120 of embodiment 3 is configured similarly to the inductor 100 of embodiment 1 except that the outer electrodes are not arranged on the top surface 14 and the side surfaces 18 and are arranged on parts of the bottom surface 12 and parts of the end surfaces 16.

In the inductor 120, the outer electrodes 40 are arranged along parts of the bottom surface 12 and parts of the end surfaces 16. This makes it possible to reduce the size of fillets formed when mounting the inductor 120 on a substrate and as a result higher mounting density is possible.

In the above-described inductor, a case has been described in which the outer electrodes are arranged along at least the bottom surface and the end surfaces of the body, but the outer electrodes may instead be arranged on only the bottom surface of the body. The end surfaces of the conductor in the extension direction of the body may be exposed at the side surfaces of the body. The end portions of the lead-out portions may be exposed at the bottom surface of the body rather than at the end surfaces of the body. A cross section of the conductor in a direction perpendicular to the extension direction of the conductor has been a substantially rectangular shape, but not limited to rectangular shape, the corners of the cross section may be chamfered and each side may form a curve such as a semicircle or a semi-ellipse. The shape of the winding portion of the coil when viewed in the direction of the winding axis may be a shape other than a substantially elliptical shape such as a substantially circular shape, a substantially oval shape, a chamfered substantially polygonal shape, or the like. A recess (standoff) may be formed in the region of the bottom surface of the body where the outer electrodes are not arranged. The recess on the bottom surface of the body may have a semicircular shape in the direction of the height T when viewed in the direction of the width W.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:

a body including a magnetic portion containing a magnetic powder and a first resin;

a coil that is contained in the body and includes a winding portion formed by winding a conductor and a pair of lead-out portions that extend from the winding portion; and a pair of outer electrodes to which at least end portions of the lead-out portions are connected at surfaces of the body, the outer electrodes each including an electrically conductive resin layer and a first cover layer arranged on the electrically conductive resin layer, the electrically conductive resin layers each containing an electrically conductive powder and a second resin, and the electrically conductive resin layers each including a plurality of vias arranged in a branch-like manner made of a same material as a material in the first cover layers penetrating through voids formed from curing shrinkage or thermal contraction in the conductive resin layer connecting the conductor to the first cover layer, wherein the vias include nickel and are part of a nickel plating structure of the first cover layer.

2. The inductor according to claim 1, wherein the vias directly connect the end portions of the lead-out portions and the first cover layers to each other.

3. The inductor according to claim 2, wherein the magnetic powder is exposed on the surfaces of the body on which the outer electrodes are arranged, and at least portion of the exposed magnetic powder and the first cover layers are connected to each other by the vias.

4. The inductor according to claim 2, wherein the outer electrodes each further includes a second cover layer arranged on the first cover layer.

5. The inductor according to claim 4, wherein the second cover layers contain tin.

6. The inductor according to claim 2, wherein the body has a bottom surface and end surfaces that are adjacent to the bottom surface and face each other, and the outer electrodes are arranged on at least the bottom surface and the end surfaces.

7. The inductor according to claim 2, wherein the first resin is a different type of resin from the second resin.

8. The inductor according to claim 2, wherein the first resin contains a thermosetting resin and the second resin contains a thermoplastic resin.

9. The inductor according to claim 2, wherein the first cover layers have a thickness of 100 μm or less.

10. The inductor according to claim 1, wherein the magnetic powder is exposed on the surfaces of the body on which the outer electrodes are arranged, and at least portion of the exposed magnetic powder and the first cover layers are connected to each other by the vias.

11. The inductor according to claim 1, wherein the outer electrodes each further includes a second cover layer arranged on the first cover layer.

12. The inductor according to claim 11, wherein the second cover layers contain tin.

13. The inductor according to claim 1, wherein the body has a bottom surface and end surfaces that are adjacent to the bottom surface and face each other, and the outer electrodes are arranged on at least the bottom surface and the end surfaces.

14. The inductor according to claim 13, wherein end portions of the lead-out portions are exposed at the end surfaces.

15. The inductor according to claim 1, wherein the first resin is a different type of resin from the second resin.

16. The inductor according to claim 1, wherein the first resin contains a thermosetting resin and the second resin contains a thermoplastic resin.

17. The inductor according to claim 1, wherein the first cover layers have a thickness of 100 μm or less.

* * * * *